United States Patent [19]

Prozzo

[11] Patent Number: 5,523,837
[45] Date of Patent: Jun. 4, 1996

[54] BEAM STEALER LASER POWER METER

[76] Inventor: Christopher D. Prozzo, R.R. 3, Box 169J, Athens, Vt. 05143

[21] Appl. No.: 276,934

[22] Filed: Jul. 19, 1994

[51] Int. Cl.[6] ........................................ G01J 1/04
[52] U.S. Cl. ................................................ 356/218
[58] Field of Search ............................ 356/121, 218, 356/225; 357/636

[56] References Cited

U.S. PATENT DOCUMENTS

| 3,344,703 | 10/1967 | Milton | 356/218 |
| 4,035,088 | 5/1977 | Jenkins et al. | 356/218 |
| 4,448,545 | 6/1984 | Pelka et al. | 374/41 |
| 4,459,986 | 7/1984 | Karaki | 128/303.1 |
| 5,004,338 | 4/1991 | Morrow | 356/218 |
| 5,184,189 | 12/1993 | Hawsey et al. | 356/218 |

*Primary Examiner*—Richard A. Rosenberger
*Attorney, Agent, or Firm*—Herbert M. Wolfson

[57] ABSTRACT

An essentially non-intrusive laser power meter is described which is dependent on the reflection of a minor fraction of energy from a laser beam. A small beam splitter positioned on the periphery of the laser beam directs a small amount of the beam's reflected energy to a silicon photodiode. The output signal from the photodiode is then sent to a meter readout to indicate the beam energy.

2 Claims, 1 Drawing Sheet

BEAM STEALER LASER POWER METER

BACKGROUND OF THE INVENTION

This invention relates to a method for measuring the energy output of a pulsed or continuous wave laser by removing an insignificant but diagnostic portion of energy from the beam.

Applications abound in which the measurement of the power in a laser beam is essential, such as medical or military situations, without removal of energy from the laser beam. In the majority of cases in the past, the beam is blocked completely or a significant fraction of the energy is removed. This method subjects the device to possible permanent damage and changes in power levels, and puts personnel in danger of exposure to the laser beam. In another case the detector is positioned out of the laser beam and depends upon the emission of extraneous light from the lasing medium as a correlated measure of the laser output. This measurement method is problematic because the changes in the power level may not be reflected correctly from a measurement based on extraneous energy as the laser components age and the detector components change characteristics. This could lead to errors in medical procedures or power levels in general physics work.

Thus there is need for a system which continuously and accurately measures the energy, the dynamic changing across time, and the characteristics of the laser performance.

SUMMARY OF THE INVENTION

The objective of this invention is to provide a laser monitoring system which addresses the above stated need with a continuous dynamic measurement of the laser beam energy which does not appreciably alter the energy output of the laser and gives accurate energy levels at all times.

This method applies to all types of lasers including continuous, pulse, and LED configurations. Other advantages will become apparent to skilled laser physicists.

Briefly, the invention is the use of a small beam splitter which removes less than 1% of the energy from the laser beam. The energy from the beam splitter is directed at the photodetector. Since the same small fraction of the laser beam energy is always removed, there is no variation in the output from the laser in its applications. The photodetector energizes a meter which gives the output at all times.

DETAILED DESCRIPTION

Figure 1:
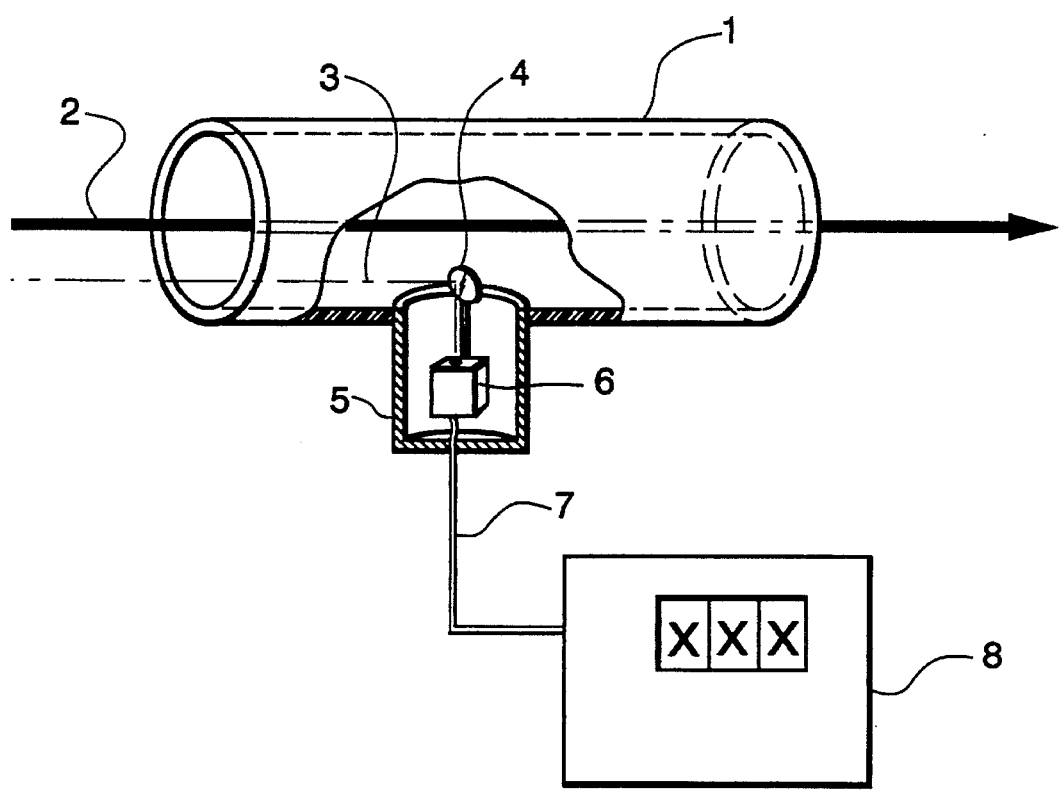
FIG. 1 is a schematic diagram of a system for monitoring the output of a laser.

Referring to FIG. 1, which depicts the non-intrusive laser beam monitor of the current invention, a beamsplitter which is positioned to measure the power of the laser beam 2 emanating from all types of lasers. The laser beam is directed in an axial fashion through the cylindrical element 1. A small portion of the incident laser beam 3 is interrupted by the beam splitter element 4 which directs less than 1% of the incident beam to the light detector 6. The light detector 6 is housed in a protective metal box 5. The output signal from the detector 7 is sent to the meter readout which gives a constantly updated status of the power in the laser beam.

The type of the laser beam to be measured is not consequential, nor is the incident diameter of the beam. The detection element for the measurement of the laser light will be matched to the laser wavelength and can extend from detectors for excimers in the VUV (vacuum ultra violet) region below 200 nanometers to 500 microns in the FIR (far infrared.)

The beam splitter performs two functions, the one being to transform energy from the laser beam to the detector and the second being to reduce polarization effect. The angle of incidence of the laser beam to the beam splitter is set to a 5° to 45° angle in order to suppress the polarization effect, and the beam splitter is also coated with one of several heavy metal oxide compositions in order to assist in suppressing the polarization effect.

The type of laser being evaluated as to power output can be of any type, such as the Excimer lasers ArF, KrF, XeCl, and XeF, Argon, Nitrogen, dye laser, LED's, and chemical reaction types as well as the classic Nd:YAG, Ruby, alexandrite, emerald, gas types of the He-Ne sort, etc.

Variations of the above technology will be obvious to those skilled in the laser art.

I claim:

1. A device for monitoring the output of a laser comprising:

a) a laser generating a beam of electromagnetic radiation;

b) a tubular element adapted to transmit said radiation therethrough;

c) a beam splitter optic element placed within said tubular element at a position to intercept up to 5% of the radiation transmitted through said tubular element and at an angle of incidence with said beam of radiation of from 5 – 45 degrees, the surface of said beam splitter optic element being coated with a heavy metal oxide; and d) a detection element positioned to receive said 5% of said radiation reflected from the surface of said beam splitter optic element and to generate an output signal proportional to the power of said laser beam.

2. The laser power meter of claim 1 in which said light detector is a silicon, germanium, gallium arsenide or similar photodiode.

* * * * *